(12) United States Patent
Bavor, Jr. et al.

(10) Patent No.: US 11,887,513 B2
(45) Date of Patent: Jan. 30, 2024

(54) CASE FOR SMARTGLASSES WITH CALIBRATION CAPABILITIES

(71) Applicant: GOOGLE LLC, Mountain View, CA (US)

(72) Inventors: Clayton Woodward Bavor, Jr., Mountain View, CA (US); Steven Benjamin Goldberg, Los Altos Hills, CA (US); Zhiheng Jia, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/163,067

(22) Filed: Feb. 1, 2023

(65) Prior Publication Data

US 2023/0245603 A1    Aug. 3, 2023

Related U.S. Application Data

(60) Provisional application No. 63/267,451, filed on Feb. 2, 2022.

(51) Int. Cl.
| | | |
|---|---|---|
| *G09G 3/00* | (2006.01) | |
| *G06T 3/60* | (2006.01) | |
| *G02B 27/01* | (2006.01) | |

(52) U.S. Cl.
CPC ......... *G09G 3/001* (2013.01); *G02B 27/0172* (2013.01); *G06T 3/60* (2013.01); *G02B 2027/014* (2013.01); *G02B 2027/0138* (2013.01); *G02B 2027/0178* (2013.01);
(Continued)

(58) Field of Classification Search
CPC ........... G09G 3/001; G09G 2320/0693; G09G 2340/0492; G02B 27/0172; G02B 2027/0138; G02B 2027/014; G02B 2027/0178; G02B 27/017; G02B 27/01; G02B 27/00; G02B 1/00; G02B 26/00; G02B 30/00; G06T 3/60; G06F 3/015; G06F 3/01; G06F 3/011; G06F 3/012; G06F 3/013; G06F 3/014; G06F 3/017
See application file for complete search history.

(56) References Cited

U.S. PATENT DOCUMENTS

| | | |
|---|---|---|
| 11,042,034 B2 | 6/2021 | Sztuk et al. |
| 2014/0285676 A1* | 9/2014 | Barreto ............... H04N 17/002 348/333.08 |
| 2016/0021363 A1 | 1/2016 | Chavez et al. |

(Continued)

FOREIGN PATENT DOCUMENTS

WO    2020132243 A1    6/2020

OTHER PUBLICATIONS

International Search Report and Written Opinion for PCT Application No. PCT/US2023/061845, dated May 30, 2023, 14 pages.

(Continued)

*Primary Examiner* — Pegeman Karimi
(74) *Attorney, Agent, or Firm* — Brake Hughes Bellermann LLP

(57) ABSTRACT

Techniques include performing a display calibration while a smartglasses device is stored in a case that enables the smartglasses device to perform display calibrations. The case includes an optical device configured to form an image of a test pattern formed in a first display and a second display of the smartglasses device.

20 Claims, 13 Drawing Sheets

(52) U.S. Cl.
CPC ............... *G09G 2320/0693* (2013.01); *G09G 2340/0492* (2013.01)

(56) References Cited

U.S. PATENT DOCUMENTS

| | | | |
|---|---|---|---|
| 2016/0328882 A1* | 11/2016 | Lee | G06T 5/006 |
| 2017/0169747 A1* | 6/2017 | Richards | G09G 3/006 |
| 2019/0197982 A1 | 6/2019 | Chi et al. | |
| 2020/0209628 A1* | 7/2020 | Sztuk | G02B 27/0176 |
| 2020/0349902 A1* | 11/2020 | Machida | G02B 27/0101 |

OTHER PUBLICATIONS

Tuceryan, et al., "Single-Point Active Alighnment Method (SPAAM) for Optical See-Through HMD Calibration for Augmented Reality", Presence: Teleoperators and Virtual Environments, vol. 11, Issue 3, Jun. 2002, 33 pages.

\* cited by examiner

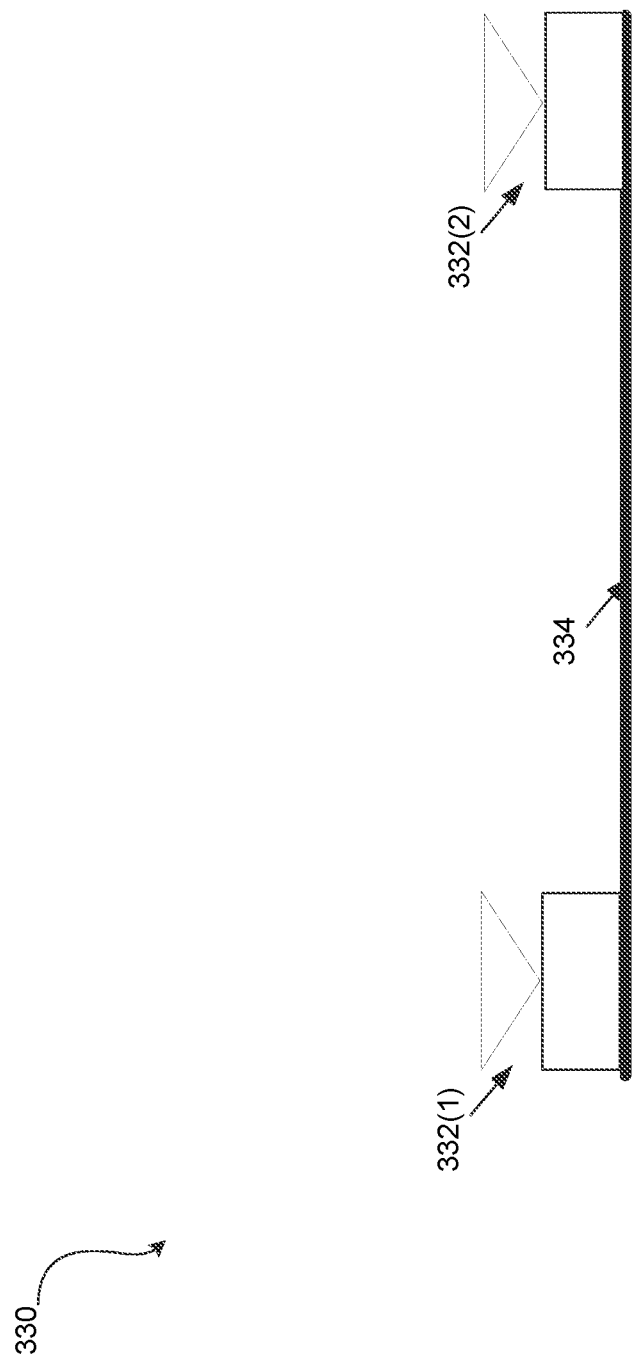

CASE FOR SMARTGLASSES WITH CALIBRATION CAPABILITIES

CROSS REFERENCE TO RELATED APPLICATION

This application claims the benefit of U.S. Provisional Application No. 63/267,451, filed Feb. 2, 2022, the disclosure of which is incorporated herein by reference in its entirety.

TECHNICAL FIELD

This description relates in general to head mounted wearable devices, and in particular, to a case for storing a smartglasses device that has capabilities for calibrating displays of the smartglasses device.

SUMMARY

The improvement discussed herein is directed to a case for storing a smartglasses device used in augmented reality (AR) systems. The case is capable of enabling the smartglasses device to perform a calibration operation on itself in order to reduce or eliminate display misalignment, especially display vertical misalignment. The case includes an optical device configured to form an image of a test pattern formed in a first display and a second display of the smartglasses device. In one example, the optical device is a mirror disposed on a world-side end of the case that forms an image of the test pattern formed in the first display and the second display. In this example, a world-facing camera of the smartglasses may form an image of the mirror and based on the image, processing circuitry of the smartglasses device deduces a transformation (e.g., rotation and translation) of pixels in the first and second display such that the display vertical misalignment is reduced significantly. In another example, the optical device is a pair of cameras disposed on either end of a rigid body such that the rigid body is disposed on a user-facing end of the case. The cameras form an image of the test pattern in respective displays and relay that image to processing circuitry of the smartglasses device; the processing circuitry of the smartglasses device deduces a transformation (e.g., rotation and translation) of pixels in the first and second display based on the image such that the display vertical misalignment is reduced significantly. In a further example, the optical device includes a pair of phase detection photodiode sets that detect a position of a portion of the test pattern within the display. The optical device then communicates the position of the portion to processing circuitry of the smartglasses device; based on the position, the processing circuitry deduces a transformation (e.g., rotation and translation) of pixels in the first and second display such that the display vertical misalignment is reduced significantly.

In a general aspect, a system includes a smartglassses device including a first display and a second display. The system also includes a case for enclosing the smartglasses device, the case including a mirror that is configured to reflect light from a test pattern formed in the first display and the second display. The smartglasses device further includes processing circuitry coupled to a memory, the processing circuitry being configured to, while disposed within the case, form the test pattern in each of the first display and the second display; receive image data representing the reflected light from the test pattern formed in the first display and the second display; and determine a transformation of at least one of a first set of pixels in the first display and a second set of pixels in the second display such that the test pattern in the first display is substantially aligned with the test pattern in the second display, the transformation being based on the image data.

In another general aspect, a system includes a smartglassses device including a first display and a second display. The system also includes a case for enclosing the smartglasses device, the case including an optical device that is configured to capture an image of a test pattern formed in the first display and the second display. The smartglasses device further includes processing circuitry coupled to a memory, the processing circuitry being configured to, while disposed within the case, form the test pattern in each of the first display and the second display; receive image data representing the captured image of the test pattern formed in the first display and the second display; and determine a transformation of at least one of a first set of pixels in the first display and a second set of pixels in the second display such that the test pattern in the first display is substantially aligned with the test pattern in the second display, the transformation being based on the image data.

In another general aspect, a method includes forming a test pattern in a first display and a second display of a smartglasses device while the smartglasses device is disposed in a case, the case including a mirror configured to reflect light from a test pattern formed in the first display and the second display. The method also includes receiving image data representing the reflected light from the test pattern formed in the first display and the second display. The method further includes determining a transformation of at least one of a first set of pixels in the first display and a second set of pixels in the second display such that the test pattern in the first display is substantially aligned with the test pattern in the second display, the transformation being based on the image data.

In another general aspect, a method includes forming a test pattern in a first display and a second display of a smartglasses device while the smartglasses device is disposed in a case, the case including an optical device configured to capture an image of a test pattern formed in the first display and the second display. The method also includes receiving image data representing the reflected light from the test pattern formed in the first display and the second display. The method further includes determining a transformation of at least one of a first set of pixels in the first display and a second set of pixels in the second display such that the test pattern in the first display is substantially aligned with the test pattern in the second display, the transformation being based on the image data.

The details of one or more implementations are set forth in the accompanying drawings and the description below. Other features will be apparent from the description and drawings, and from the claims.

BRIEF DESCRIPTION OF THE DRAWINGS

FIG. 3B is a diagram illustrating an example pair of cameras.

DETAILED DESCRIPTION

Augmented reality (AR) is an interactive experience of a real-world environment where the objects that reside in the real world are enhanced by computer-generated perceptual information, sometimes across multiple sensory modalities, including visual, auditory, and/or haptic. Some AR systems provide such an interactive experience using a smartglasses device that can provide visual information via a camera mounted on a frame and waveguides and lenses in the frame, and audio and tactile information via the frame.

A challenge in AR is maintaining display alignment in the face of frame deformations in the smartglasses device. Some frame deformations are a result of the frames being flexible for user comfort; in this case the frame may flex as the user puts the frame on or adjusts the frame while wearing. Some frame deformations are a result of an aging of the frame, as the frame material may warp with age (e.g., on the order of months).

Thus, in order to minimize or eliminate display misalignment—in particular, display vertical misalignment—the smartglasses display should be calibrated so that the display on the left and the display on the right are aligned. That is, if a sensor indicates that the displays are misaligned, then circuitry in the smartglasses device should perform a mapping of pixels of one or both displays in the smartglasses device to enforce an alignment.

A conventional approach to detecting display misalignment is to detect frame deformations while a user is wearing the smartglasses device. Nevertheless, a technical problem with detecting display misalignment while a user is wearing the smartglasses device is that the user may experience a misaligned display while wearing the smartglasses device. A misaligned display may cause significant discomfort to the user.

A technical solution to the above-described technical problem includes performing a display calibration while the smartglasses device is stored in a case that enables the smartglasses device to perform display calibrations.

An example AR system that can be used in connection with the technical solution are described in FIGS. 1A-1D.

Figure 1A:
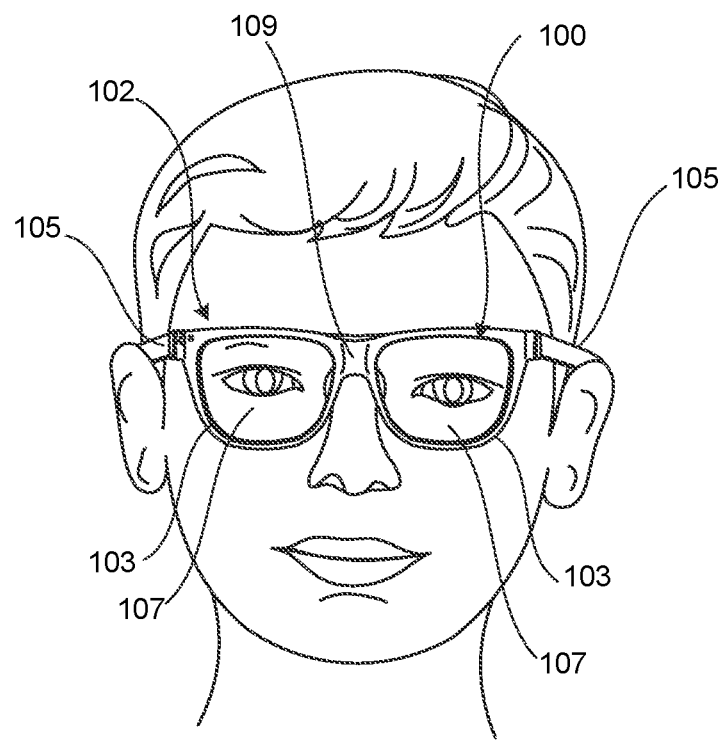
FIG. 1A illustrates an example system, in accordance with implementations described herein.

FIG. 1A illustrates a user wearing an example smartglasses device 100. In this example, the example smartglasses device 100 including display capability and computing/processing capability, for purposes of discussion and illustration. The principles to be described herein may be applied to other types of eyewear, both with and without display capability and/or computing/processing capability.

Figure 1B:
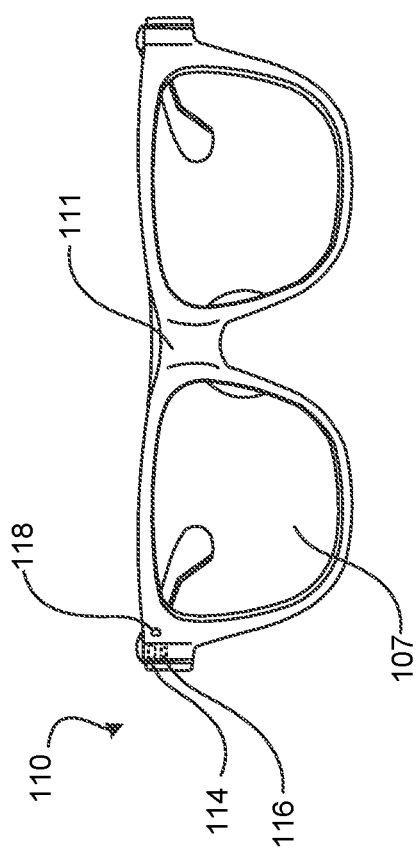
FIG. 1B is a front view.
Figure 1C:
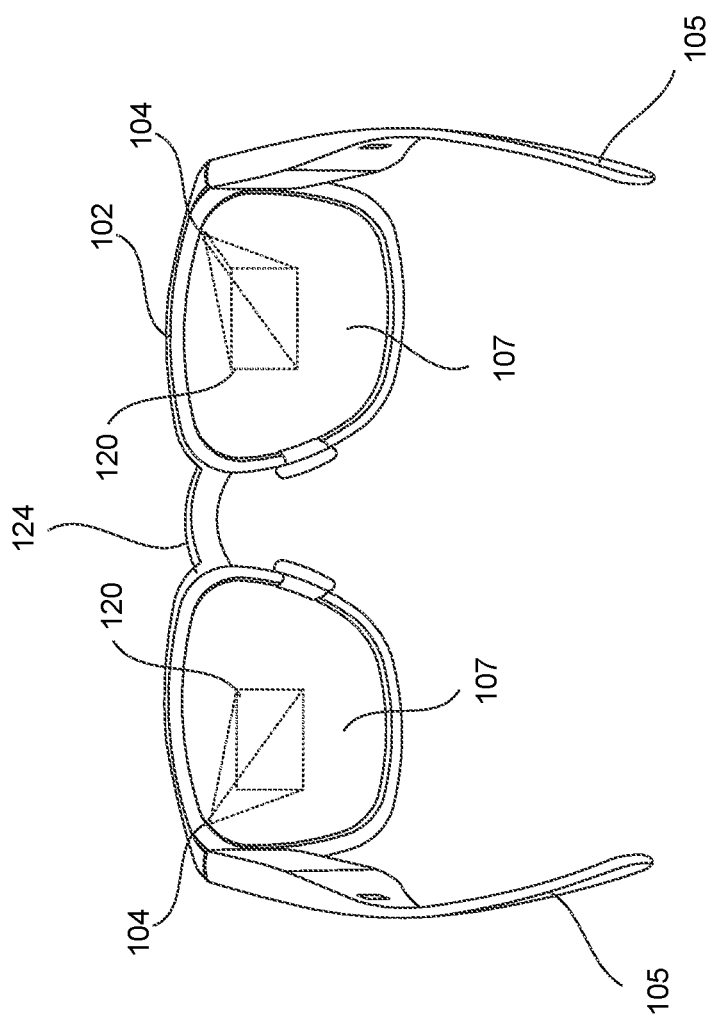
FIG. 1C is a rear view.
Figure 1D:
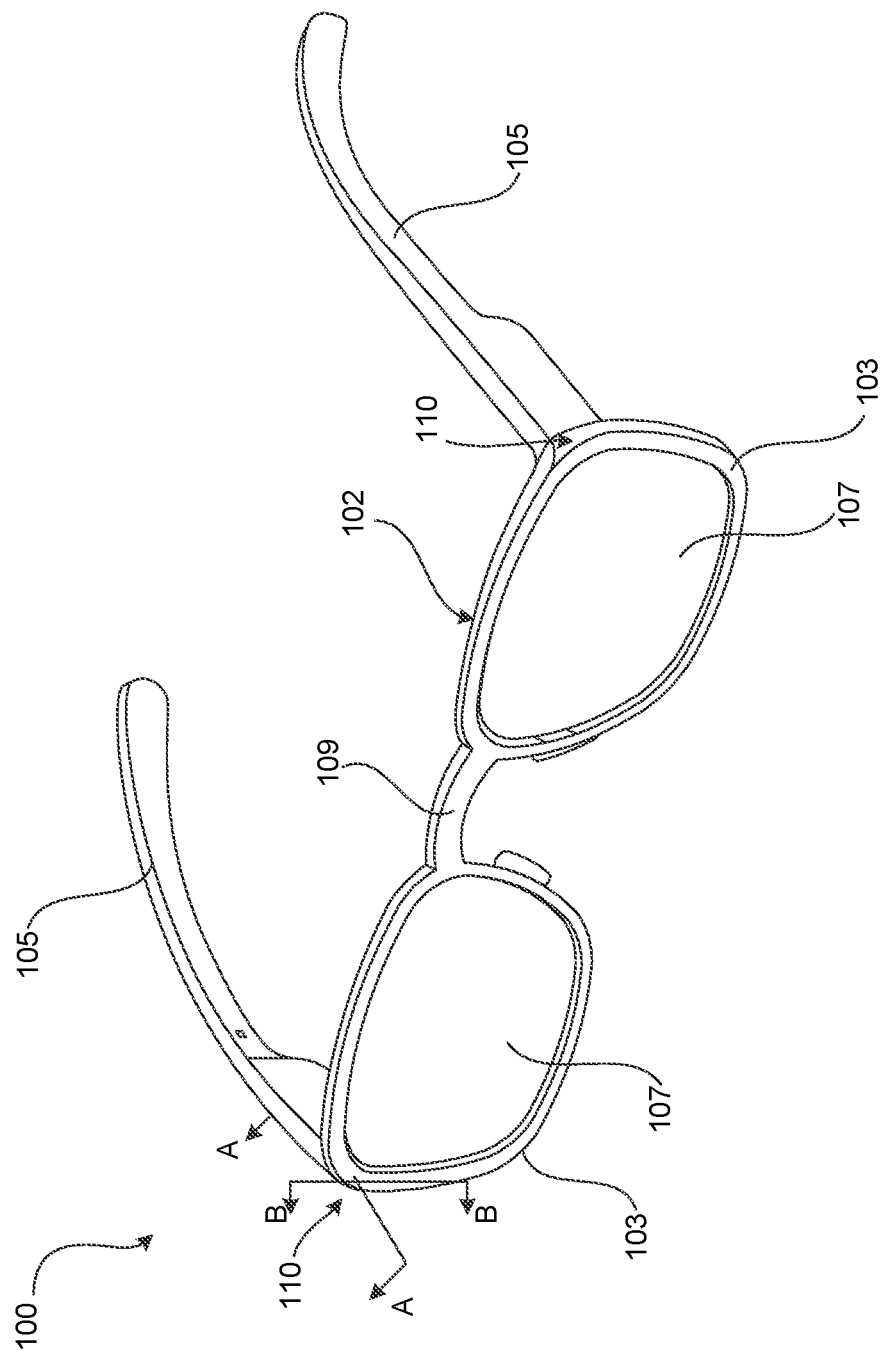
FIG. 1D is a perspective view, of the example head mounted wearable device shown in FIG. 1A, in accordance with implementations described herein.

FIG. 1B is a front view, FIG. 1C is a rear view, and FIG. 1D is a perspective view, of the example head mounted wearable device 100 shown in FIG. 1A. The above-described gestures determined from electrical impedance tomographs in the form of continuous hand kinematics may be used to trigger execution of commands related to objects being displayed in smartglasses device 100.

As shown in FIG. 1B-1D, the example smartglasses device 100 includes a frame 102. The frame 102 includes a front frame portion defined by rim portions 103 surrounding respective optical portions in the form of lenses 107, with a bridge portion 109 connecting the rim portions 109. Arm portions 105 are coupled, for example, pivotably or rotatably coupled, to the front frame by hinge portions 110 at the respective rim portion 103. In some examples, the lenses 107 may be corrective/prescription lenses. In some examples, the lenses 107 may be an optical material including glass and/or plastic portions that do not necessarily incorporate corrective/prescription parameters. A display device 104 may be coupled in a portion of the frame 102. In the example shown in FIGS. 1B and 1C, the display device 104 is coupled in the arm portion 105 of the frame 102. In some examples, the head mounted wearable device 100 can also include an audio output device 106 (such as, for example, one or more speakers), an illumination device 108, a sensing system 111, a control system 112, at least one processor 114, and an outward facing image sensor 116, or camera 116. In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104 via outcoupled light 120.

A challenge in AR is maintaining display alignment in the face of frame deformations in the smartglasses device. Some frame deformations are a result of the frames being flexible for user comfort; in this case the frame may flex as the user puts the frame on or adjusts the frame while wearing. Some frame deformations are a result of an aging of the frame, as the frame material may warp with age (e.g., on the order of months).

Thus, in order to minimize or eliminate display misalignment—in particular, display vertical misalignment—the smartglasses display should be calibrated so that the display on the left and the display on the right are aligned. That is, if a sensor indicates that the displays are misaligned, then circuitry in the smartglasses device should perform a mapping of pixels of one or both displays in the smartglasses device to enforce an alignment.

A conventional approach to detecting display misalignment is to detect frame deformations while a user is wearing the smartglasses device. Nevertheless, a technical problem with detecting display misalignment while a user is wearing the smartglasses device is that the user may experience a misaligned display while wearing the smartglasses device. A misaligned display may cause significant discomfort to the user.

In accordance with the implementations described herein, a technical solution to the above-described technical problem includes performing a display calibration while the smartglasses device is stored in a case that enables the smartglasses device to perform display calibrations. The case includes an optical device configured to form an image of a test pattern formed in a first display and a second display of the smartglasses device. In one example, the optical device is a mirror disposed on a world-side end of the case that forms an image of the test pattern formed in the first display and the second display. In this example, a world-facing camera of the smartglasses device may form an image of the mirror and based on the image, processing circuitry of the smartglasses device deduces a transformation (e.g., rotation and translation) of pixels in the first and second display such that the display vertical misalignment is reduced significantly. In another example, the optical device is a pair of cameras disposed on either end of a rigid body such that the rigid body is disposed on a user-facing end of the case. The cameras form an image of the test pattern in respective displays and relay that image to processing circuitry of the smartglasses device; the processing circuitry of the smartglasses device deduces a transformation (e.g., rotation and translation) of pixels in the first and second display based on the image such that the display vertical misalignment is reduced significantly. In a further example, the optical device includes a pair of phase detection photodiode sets that detect a position of a portion of the test pattern within the display. The optical device then communicates the position of the portion to processing circuitry of the smartglasses device; based on the position, the processing circuitry deduces a transformation (e.g., rotation and translation) of pixels in the first and second display such that the display vertical misalignment is reduced significantly A technical advantage of the technical solution is that, in contrast to the conventional approaches, the smartglasses device is calibrated by the time the user wears them. This prevents the user from experiencing discomfort from having to see misaligned displays.

Figure 2A:
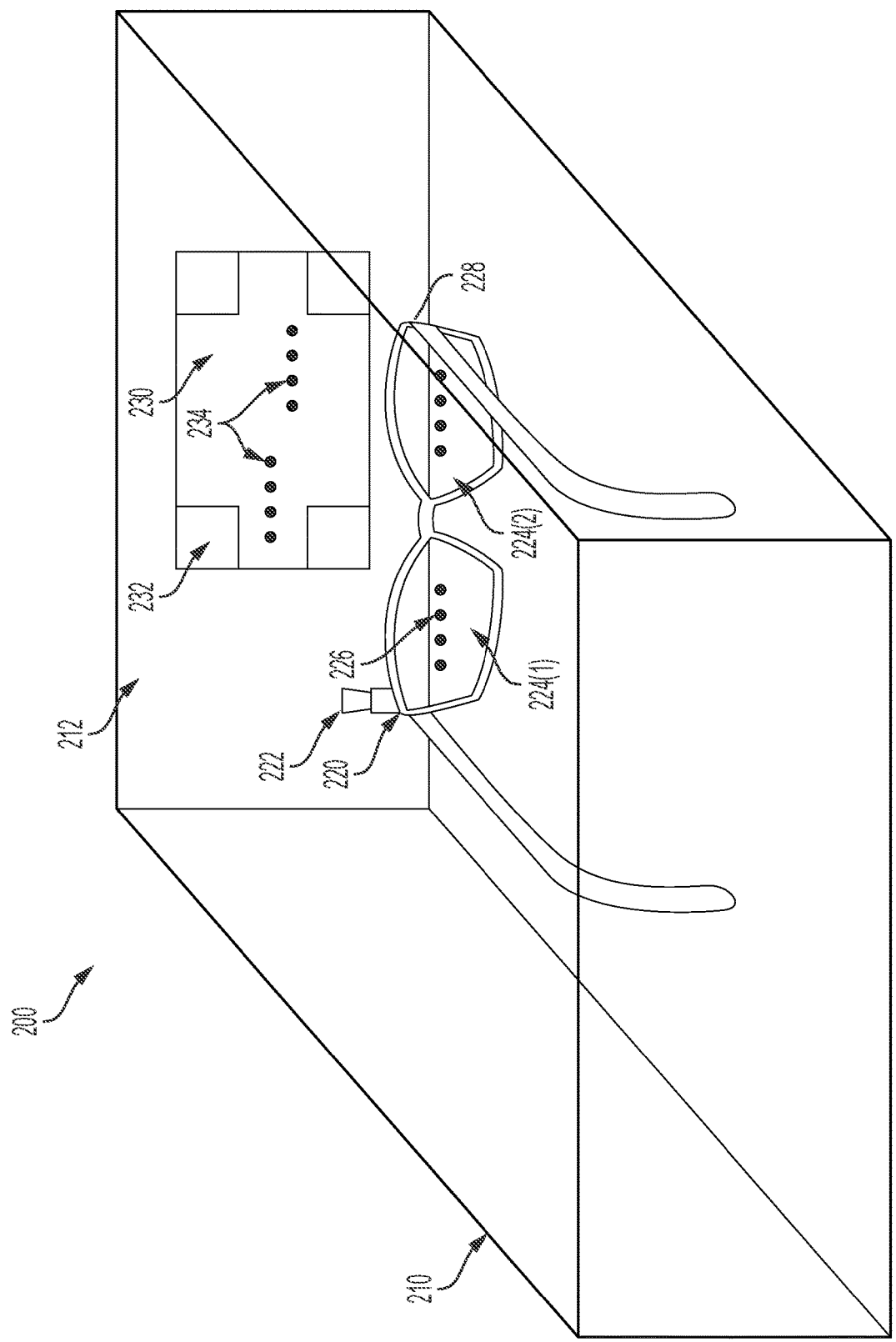
FIG. 2A is a diagram illustrating an example case with a mirror disposed on a world-facing end of the case.

FIG. 2A is a diagram illustrating an example scenario 200 in which the optical device of the case is on a world-facing side of the smartglasses device 220. As shown in FIG. 2A, the smartglasses device 220 is stored, unfolded, in the case 210.

As also shown in FIG. 2A, the optical device is a mirror 230. In some implementations, however, the optical device can be anything that reflects a test pattern, e.g., a screen, a grating, etc.

In some implementations, the case 210 is made from rigid materials, e.g., metal, hard plastic, ceramic. In some implementations, the case 210 is made from softer materials, e.g., acrylic. In some implementations, the case 210 is transparent. In some implementations, the case 210 is opaque.

The case 210 has dimensions such that an unfolded smartglasses device fits in the case with enough clearance for an image of a test pattern 226 formed in smartglasses displays 224(1) and 224(2) to form in the mirror 230, as well as for an image of the mirror 230 to form in a world-facing camera 222 disposed on a frame of the smartglasses device. In some implementations, the case 210 includes materials to hold the smartglasses device 220 in place while enclosed in the case 210.

As shown in FIG. 2A, the case 210 includes the mirror 230, disposed at an end 212 of the case facing a world-facing side of the smartglasses device 220. Accordingly, in some implementations, the world-facing camera 222 faces a direction toward the mirror 230. In some implementations, mirror 230 is disposed on the end 212 such that the midline (e.g., horizontal axis of symmetry) of the mirror and a horizontal axis of symmetry of the smartglasses device 220 through the displays 224(1), 224(2) share a plane that is substantially (e.g., to within 5%, 1%, 0.5%, etc.) parallel to a top face of the case 210.

The test pattern 226 in displays 224(1) and 224(2) may be misaligned. That is, when aligned, the test pattern 226 in displays 224(1) and 224(2) as shown in FIG. 2A is a sequence of colinear dots on a horizontal line centered in their respective displays 224(1) and 224(2) (i.e., the midline or horizontal axes of displays 224(1) and 224(2)). When misaligned, the test pattern 226 in display 224(1) may be displaced a first distance from the midline and its line may be rotated a first angle from the horizontal and the test pattern in display 224(2) may be displaced a second distance from the midline and its line may be rotated a second angle from the horizontal. In some implementations, the test pattern 226 in displays 224(1) and 224(2) may be aligned when the first distance and the second distance are substantially equal (e.g., less than 5% difference) and the first angle and second angle are substantially equal (e.g., less than 1 degree difference).

Figure 2B:
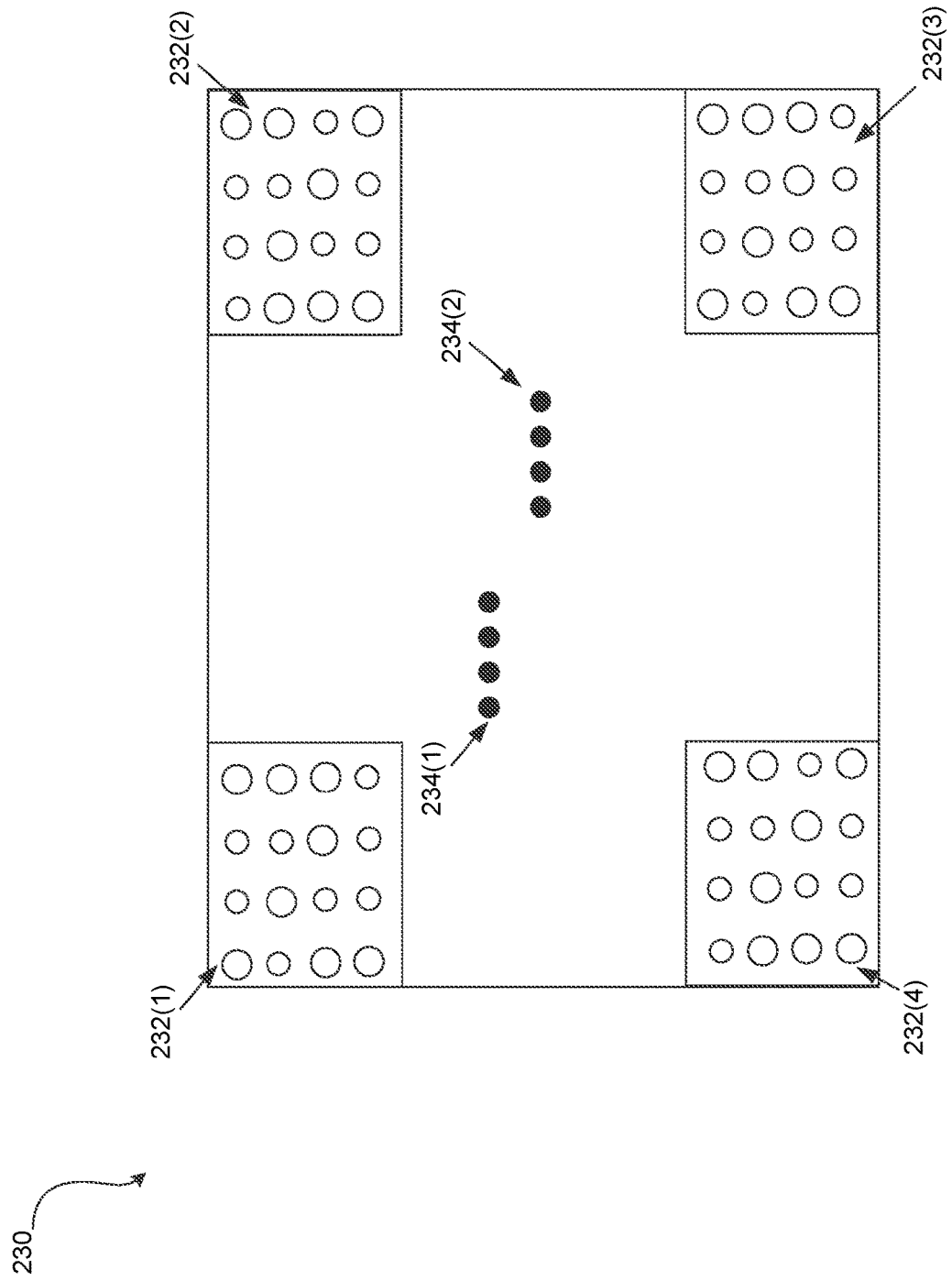
FIG. 2B is a diagram illustrating an example mirror.

FIG. 2B is a diagram illustrating a detailed view of mirror 230. As shown in FIG. 2B, mirror 230 includes fiducial markers 232, e.g., 232(1), 232(2), 232(3), 232(4). As shown in FIG. 2B, the fiducial markers are arrays of circles of different sizes arranged in arbitrary patterns. This is one example of an arrangement of fiducial marks on a mirror and such an example is not intended to be limiting.

As shown in FIG. 2B, the mirror 230 is a flat rectangle. Nevertheless, in some implementations, the mirror 230 has a finite curvature. The curvature may be in one direction (e.g., cylindrical) or in two directions (e.g., spherical). An advantage of having a curved mirror 230 is that the curvature may help the world-facing camera 222 see both displays 224(1) and 224(2). Another advantage of a curved mirror is that it may reduce or minimize a distance between the mirror and the displays 224(1) and 224(2), thus reducing the size of the case 210.

Returning to FIG. 2A, in some implementations, during operation processing circuitry 228 on the smartglasses device 220 generates test pattern 226 in displays 224(1) and 224(2), resulting in image 234 on the mirror 230 (e.g., images 234(1) and 234(2) in FIG. 2B, respectively.) As the world-side of the smartglasses device 220 is facing the mirror 230, the image 234 is formed from light leakage from the world-side of the displays 224(1) and 224(2) into the world-side field of view.

In some implementations, the image 234 may be formed based on the user side of the displays 224(1) and 224(2), by using a series of mirrors angled to form an image on the world-side of the case. Such an implementation, however, may be more complex than the implementations described above using leaked light in the world-side field of view.

As the image 234 is formed in the mirror 230, the world-facing camera 222 of the smartglasses device captures an image of the mirror 230. The image of the mirror 230 is then analyzed by processing circuitry 228. Based on the image of the mirror 230 (e.g., images 234(1), 234(2), and images of fiducial marks 232(1 . . . 4)), the processing circuitry 228 determines a transformation (e.g., rotation) of at least one of a first set of pixels in the display 224(1) and a second set of pixels in the display 224(2) such that the test pattern 226 in the display 224(1) is substantially aligned with the test pattern 226 in the display 224(2).

In some implementations, the processing circuitry 228 determines the transformation using a combination of blob detection and ray tracking through the mirror 230 and world-facing camera 222.

In some implementations, the processing circuitry 228 determines a first rotation between the world-facing camera 222 and the first display 224(1), and a second rotation between the world-facing camera 222 and the second display 224(2). The transformation of the first set of pixels in the display 224(1) includes the first rotation applied to the first set of pixels in the display 224(1). The transformation of the second set of pixels in the display 224(2) includes the second rotation applied to the second set of pixels in the display 224(2). When the transformation of the first set of pixels and the second set of pixels is applied, a new set of positions within the display 224(1) for the first set of pixels would then substantially (e.g., to within 5%, 1%, etc.) agree with a set of positions within the display 224(2) for the second set of pixels.

Figure 3A:
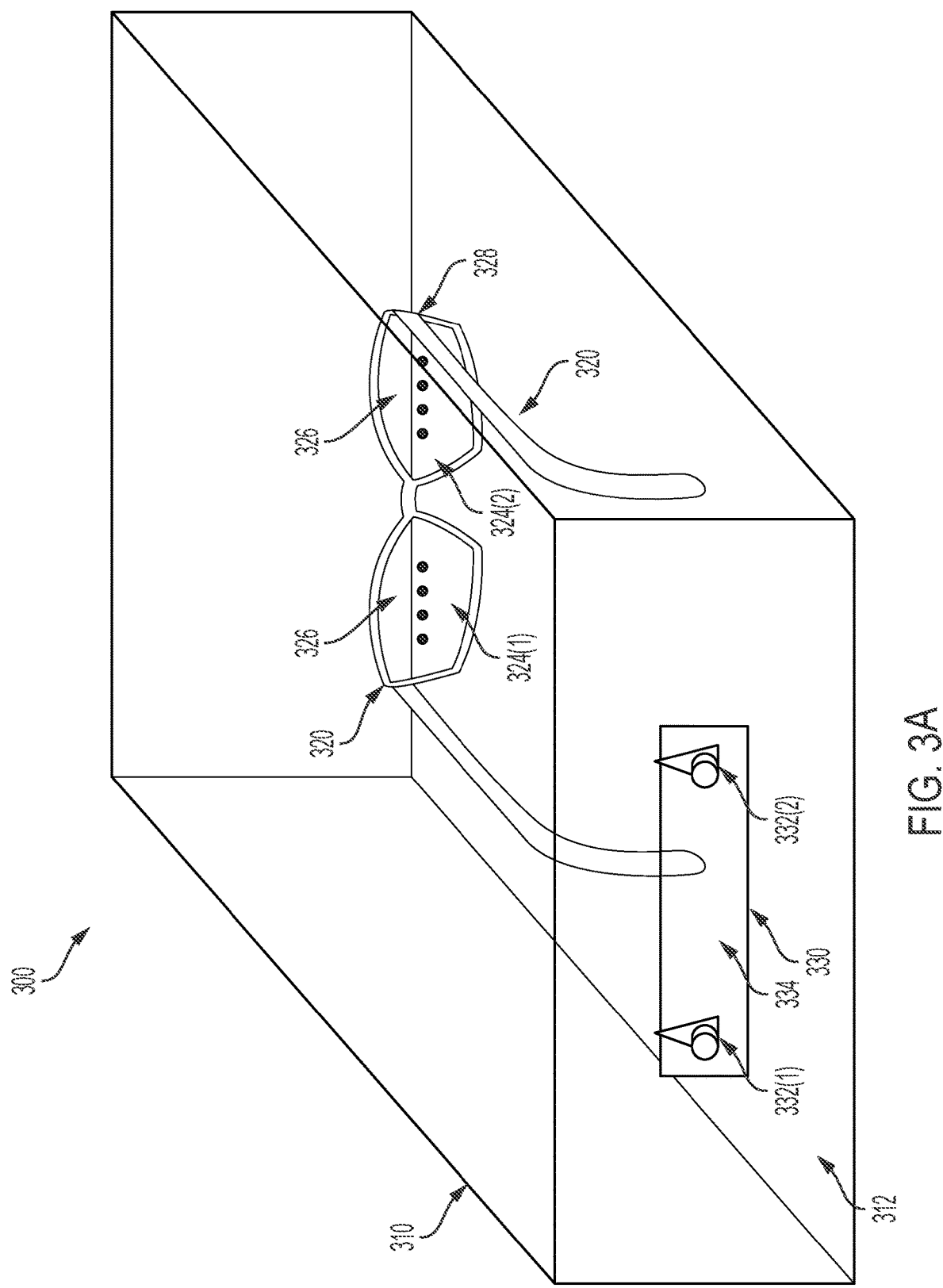
FIG. 3A is a diagram illustrating an example case with a pair of cameras disposed on a user-facing end of the case.

FIG. 3A is a diagram illustrating an example scenario 300 in which the optical device of a case 310 includes a pair of cameras 330 disposed on a user-facing end 312 of the case 310. As shown in FIG. 2A, the smartglasses device 220 is stored, unfolded, in the case 210.

In some implementations, the case 310 is made from rigid materials, e.g., metal, hard plastic, ceramic. In some implementations, the case 310 is made from softer materials, e.g., acrylic. In some implementations, the case 310 is transparent. In some implementations, the case 310 is opaque.

The case 310 has dimensions such that an unfolded smartglasses device 320 fits in the case with enough clearance for an image of a test pattern 326 formed in smartglasses displays 324(1) and 324(2) to form in the camera pair 330. In some implementations, the case 310 includes materials to hold the smartglasses device 320 in place while enclosed in the case 310.

As shown in FIG. 3A, the case 310 includes the camera pair 330, disposed at an end 312 of the case facing a user-facing side of the smartglasses device 320. In some implementations, the camera pair 330 is disposed on the end 312 such that the midline (e.g., horizontal axis of symmetry) of the camera pair 330 and a horizontal axis of symmetry of the smartglasses device 320 through the displays 324(1), 324(2) share a plane that is substantially (e.g., to within 5%, 1%, 0.5%, etc.) parallel to a top face of the case 310.

The test pattern 326 in displays 324(1) and 324(2) may be misaligned. That is, when aligned, the test pattern 326 in displays 324(1) and 324(2) as shown in FIG. 3A is a sequence of colinear dots on a horizontal line centered in their respective displays 324(1) and 324(2) (i.e., the midline or horizontal axes of displays 324(1) and 324(2)). When misaligned, the test pattern 326 in display 324(1) may be displaced a first distance from the midline and its line may be rotated a first angle from the horizontal and the test pattern in display 324(2) may be displaced a second distance from the midline and its line may be rotated a second angle from the horizontal. In some implementations, the test pattern 326 in displays 324(1) and 324(2) may be aligned when the first distance and the second distance are substantially equal (e.g., less than 5% difference) and the first angle and second angle are substantially equal (e.g., less than 1 degree difference).

FIG. 3B is a diagram showing a detailed view of camera pair 330. As shown in FIG. 3B, camera pair 330 includes cameras 332(1) and 332(2), which are disposed on a rigid body 334. The cameras 332(1) and 332(2) are attached to the end 312 of the case 310 via the rigid body 334. The cameras 332(1) and 332(2) may be small, e.g., less than 1 cm in diameter each.

Each camera 332(1) and 332(1) is capable of capturing an image of the test pattern 326 in respective displays 324(1) and 324(2). Each camera 324(1) and 324(2) is also capable of communicating image data representing the images of the test pattern 326 to processing circuitry 328 of the smartglasses device 320 for analysis. The cameras 332(1) and 332(2) are positioned such that they are inside of an eyebox of the smartglasses device 320.

Returning to FIG. 3A, in some implementations, during operation, the processing circuitry 328 displays test pattern 326 in displays 324(1) and 324(2). The cameras 332(1) and 332(2) are configured to capture a respective image of the test pattern 326 in displays 324(1) and 324(2) upon detection of photons (e.g., light) from the displays 324(1) and 324(2). Upon the capture of the respective images of the test pattern 326 in displays 324(1) and 324(2), the camera then communicates image data representing the respective images of the test pattern 326 in displays 324(1) and 324(2) to the processing circuitry 328 of the smartglasses device 320. The processing circuitry 328 then determines a transformation of at least one of a first set of pixels in the display 324(1) and a second set of pixels in the display 324(2) such that the test pattern 326 in the display 324(1) is substantially aligned (e.g., via rotation) with the test pattern 326 in the display 324(2).

In some implementations, the processing circuitry 328 determines a relative rotation between the displays 324(1) and 324(2). Accordingly, the transformation of the first set of pixels in the display 324(1) includes a rotation operation applied to, e.g., the first set of pixels in the display 324(1). For example, when a transformation of the first set of pixels within the display 324(1) involving a rotation is determined, the processing circuitry 328 left multiplies a position of the first set of pixels within the display 324(1) by a rotation matrix to produce a new set of positions for the first set of pixels within the display 324(1). The new set of positions within the display 324(1) would then substantially (e.g., to within 5%, 1%, etc.) agree with a set of positions within the display 324(2) for a second set of pixels.

In some implementations, the optical device can include only a single camera capturing an image of the test pattern from one of the displays, e.g., display 324(1) only.

Figure 4A:
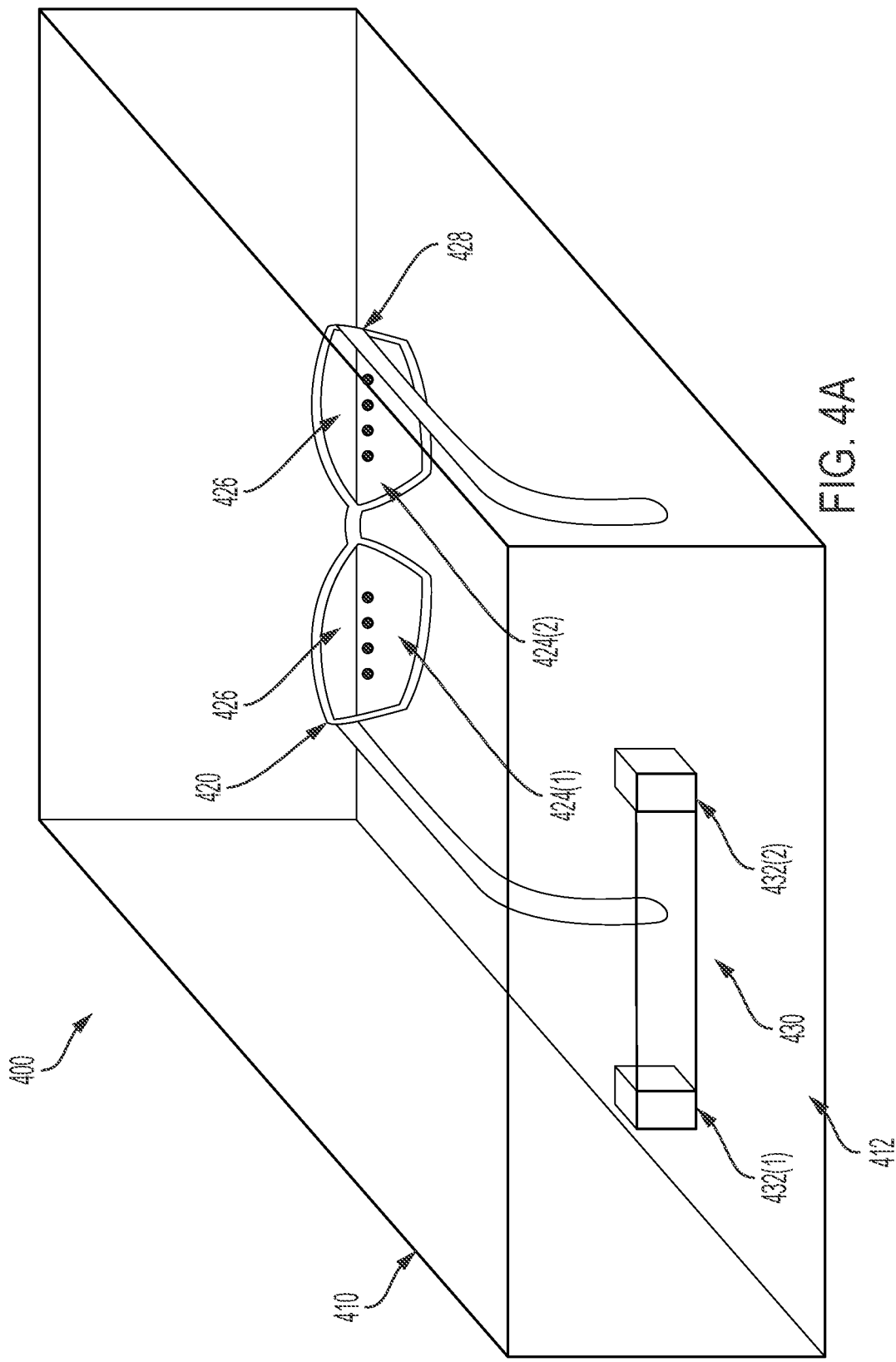
FIG. 4A is a diagram illustrating an example case with sets of phase detection photodiodes disposed on a user-facing end of the case.

FIG. 4A is a diagram illustrating an example scenario 400 in which the optical device of the case 410 includes sets of phase detection photodiodes 432(1) and 432(2) disposed on a user-facing end 412 of the case 410. As shown in FIG. 4A, the smartglasses device 420 is stored, unfolded, in the case 410.

In some implementations, the case 410 is made from rigid materials, e.g., metal, hard plastic, ceramic. In some implementations, the case 410 is made from softer materials, e.g., acrylic. In some implementations, the case 410 is transparent. In some implementations, the case 410 is opaque.

The case 410 has dimensions such that an unfolded smartglasses device 420 fits in the case with enough clearance for an image of a portion of test pattern 426 formed in smartglasses displays 424(1) and 424(2) to form in the sets of phase detection photodiodes 432(1) and 432(2). In some implementations, the case 410 includes materials to hold the smartglasses device 420 in place while enclosed in the case 410.

As shown in FIG. 4A, the case 410 includes the sets of phase detection photodiodes 432(1) and 432(2), disposed at an end 412 of the case facing a user-facing side of the smartglasses device 420. In some implementations, the sets of phase detection photodiodes 432(1) and 432(2) are disposed on the end 412 such that the midline (e.g., horizontal axis of symmetry) of the sets of phase detection photodiodes 432(1) and 432(2) and a horizontal axis of symmetry of the smartglasses device 420 through the displays 424(1), 424(2) share a plane that is substantially (e.g., to within 5%, 1%, 0.5%, etc.) parallel to a top face of the case 410.

The test pattern 426 in displays 424(1) and 424(2) may be misaligned. That is, when aligned, the test pattern 426 in displays 424(1) and 424(2) as shown in FIG. 4A is a sequence of colinear dots on a horizontal line centered in their respective displays 424(1) and 424(2) (i.e., the midline or horizontal axes of displays 424(1) and 424(2)). When misaligned, the test pattern 426 in display 424(1) may be displaced a first distance from the midline and its line may be rotated a first angle from the horizontal and the test pattern in display 424(2) may be displaced a second distance from the midline and its line may be rotated a second angle from the horizontal. In some implementations, the test pattern 426 in displays 424(1) and 424(2) may be aligned when the first distance and the second distance are substantially equal (e.g., less than 5% difference) and the first angle and second angle are substantially equal (e.g., less than 1 degree difference).

Figure 4B:
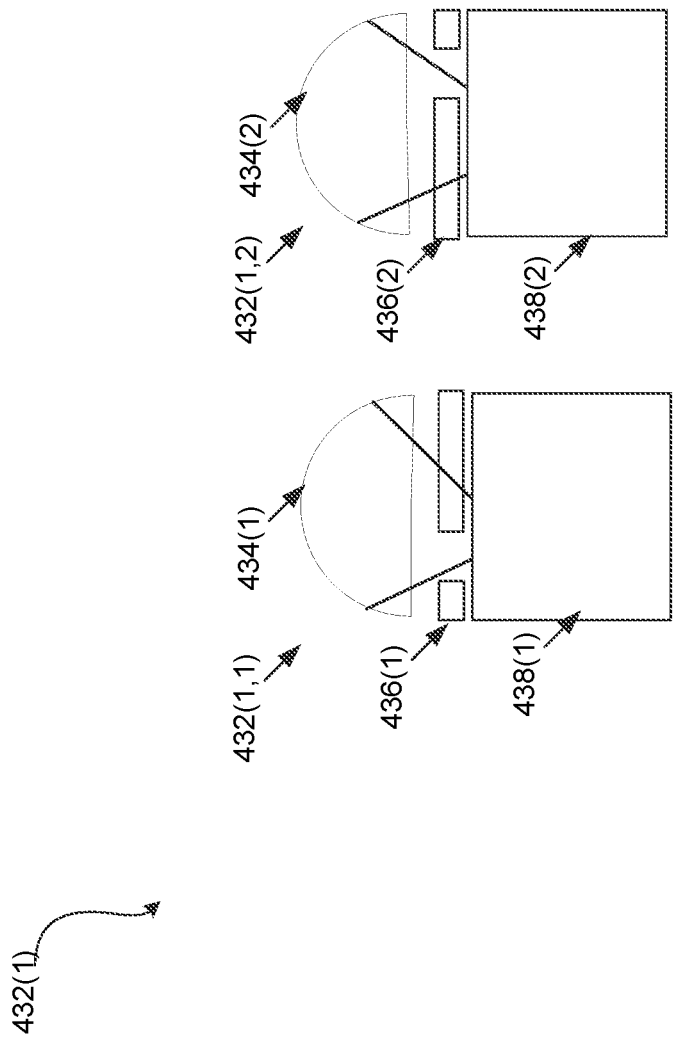
FIG. 4B is a diagram illustrating an example set of phase detection photodiodes.

FIG. 4B is a diagram showing a detailed view of set of phase detection photodiode 432(1), which as shown in FIG. 4B includes phase detection photodiodes 432(1,1) and 432(1,2). Each of phase detection photodiodes 432(1,1) and 432(1,2) includes a respective microlens 434(1) and 434(2), mask 436(1) and 436(2), and diode 438(1) and 438(2). It is noted that there may be any number of phase detection photodiodes in set 432(1) (and set 432(2)); two are shown in FIG. 4B for simplicity. It is also noted that the phase detection photodiodes in set 432(1) (and set 432(2) may be placed in any arrangement, e.g., an array of rows and columns. The sets of phase detection photodiodes 432(1) and 432(1) are similar to phase detection autofocus pixels.

Each microlens 434(1) and 434(2) focuses light from the respective display 424(1) and 424(2) toward the diode 438(1) and 438(2); more specifically, toward a center of the diode 438(1) and 438(2).

After passing through each microlens 434(1) and 434(2), light from the display 424(1) is incident on masks 436(1) and 436(2). The masks 436(1) and 436(2) are configured to block light from reaching the diode except over an aperture corresponding to light rays incident on the mask from a certain set of angles from the microlens 434(1) and 434(2).

Accordingly, each diode 438(1) and 438(2) detects a signal corresponding to the light that gets through the aperture of masks 436(1) and 436(2) and is focused in the top planes (e.g., plane closest to the masks 436(1), 436(2)) of the diodes 438(1) and 438(2). Based on an aggregation of the signals in the diodes 438(1) and 438(2), the position of a pixel that serves as the source of the light in the display 424(1) may be deduced.

Returning to FIG. 4A, in some implementations, during operation the processing circuitry 438 produces a portion (e.g., one dot of the sequence of dots) of the test pattern 426 on the displays 424(1) and 424(2). Light from the portion of the test pattern 426 in the displays 424(1) and 424(2) propagates to the sets of phase detection photodiodes 432(1) and 432(2). In turn the sets of phase detection photodiodes 432(1) and 432(2) generate signals corresponding to the light that is not blocked by the masks (e.g., 436(1), 436(2) of set 432(1)) and received by the diodes (e.g., 438(1), 438(2) of set 432(1)). Each set of phase detection photodiodes then communicates data representing the signals to the processing circuitry 428. The processing circuitry 428, upon receiving the data, aggregates the signals to determine a location of the portion of the test pattern 426 in the displays 424(1) and 424(2). This process is repeated for all portions of the test pattern 426 until the locations of all portions of the test pattern 426 in displays 424(1) and 424(2) is deduced. Upon deduction of the test pattern in the displays 424(1) and 424(2), the processing circuitry 428 determines a transformation of at least one of a first set of pixels in the display 424(1) and a second set of pixels in the display 424(2) such that the test pattern 426 in the display 424(1) is substantially aligned with the test pattern 426 in the display 424(2).

In some implementations, the processing circuitry 428 determines a relative rotation between the displays 424(1) and 424(2). Accordingly, the transformation of the first set of pixels in the display 424(1) includes a rotation operation applied to the first set of pixels in the display 424(1). For example, when a transformation of the first set of pixels within the display 424(1) involving a rotation is determined, the processing circuitry 428 left multiplies a position of the first set of pixels within the display 424(1) by a rotation matrix to produce a new set of positions for the first set of pixels within the display 424(1). The new set of positions within the display 424(1) would then substantially (e.g., to within 5%, 1%, etc.) agree with a set of positions within the display 424(2) for a second set of pixels.

Figure 5:
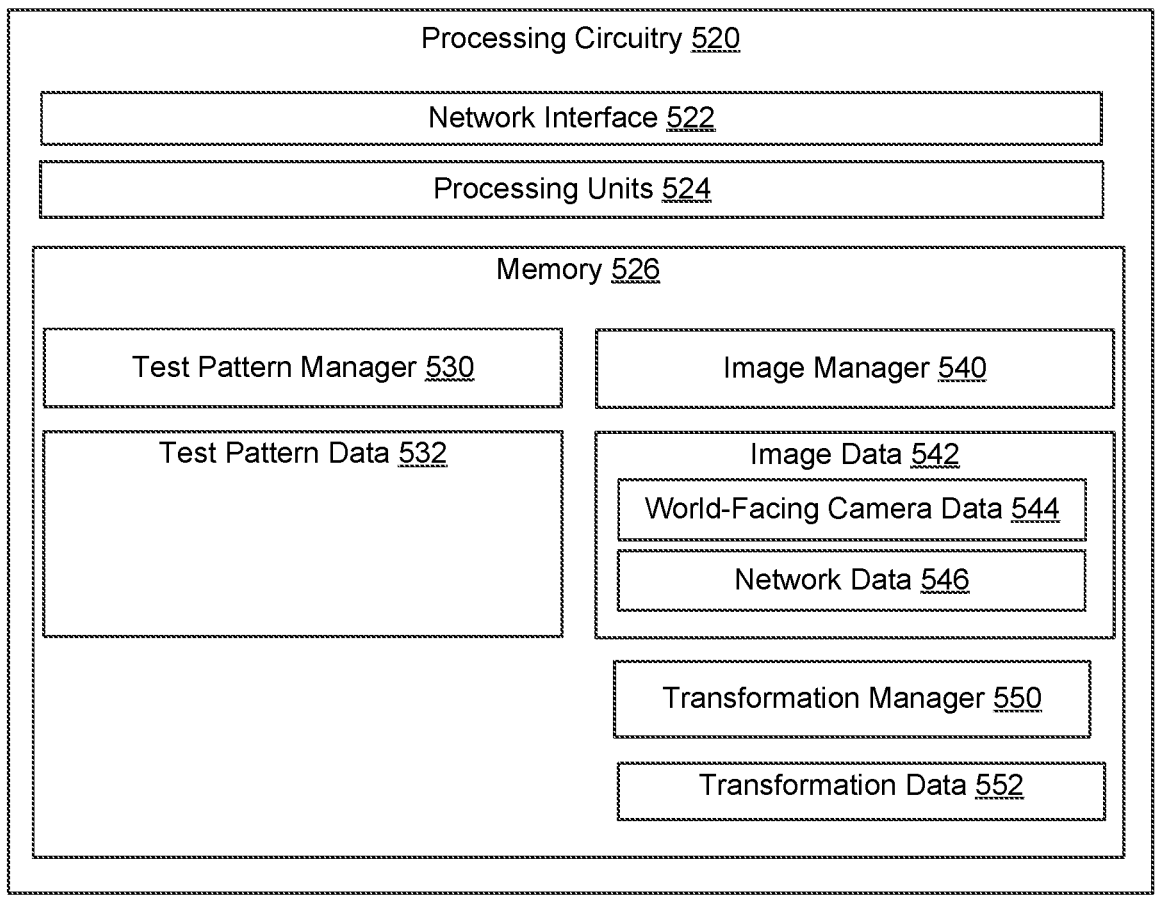
FIG. 5 is a diagram illustrating an example electronic environment for performing a calibration operation on smartglasses when stored in the case.

FIG. 5 is a diagram that illustrates example processing circuitry 520 of a smartglasses device. The processing circuitry 520 is configured to determine (deduce, generate) a transformation of at least one of a first set of pixels in a first display of the smartglasses device and a second set of pixels in a second display of the smartglasses device such that a test pattern in the first display is substantially aligned with the test pattern in the second display.

The processing circuitry 520 includes a network interface 522, one or more processing units 524, and nontransitory memory 526. The network interface 522 includes, for example, Ethernet adaptors, Bluetooth adaptors, and the like, for converting electronic and/or optical signals received from the network to electronic form for use by the processing circuitry 520. The set of processing units 524 include one or more processing chips and/or assemblies. The memory 526 includes both volatile memory (e.g., RAM) and non-volatile memory, such as one or more read only memories (ROMs), disk drives, solid state drives, and the like. The set of processing units 524 and the memory 526 together form controlling circuitry, which is configured and arranged to carry out various methods and functions as described herein.

In some implementations, one or more of the components of the processing circuitry 520 can be, or can include processors (e.g., processing units 524) configured to process instructions stored in the memory 526. Examples of such instructions as depicted in FIG. 5 include a test pattern manager 530, an image manager 540, and a transformation manager 550. Further, as illustrated in FIG. 5, the memory 526 is configured to store various data, which is described with respect to the respective managers that use such data.

The test pattern manager 530 is configured to generate a test pattern (e.g., test pattern data 532) in displays of a smartglasses device of which the processing circuitry 520 is a part. In some implementations, upon determination of a triggering condition (e.g., the smartglasses device being placed and secured in the case), the test pattern manager 530 generates a pattern in each display that may determine whether the smartglasses device has a display vertical misalignment. For example, the test pattern manager 530 generates test pattern data 532 representing a sequence of colinear dots on a horizontal line that, when displayed in aligned displays, is centered in their respective displays. In some implementations, the test pattern data 532 includes a sequence of four colinear dots.

The image manager 540 is configured to receive image data 542 representing an image of the test pattern in the displays. In some implementations, the image data 542 is received via world-facing camera on the smartglasses device in the form of world-facing camera data 544. In some implementations, the image data 542 is received via a network communication with an image capture device in the form of network data 546.

The image manager 540 is also configured to analyze image data 542 to determine a transformation (e.g., transformation data 552) of pixels in the displays that corrects display vertical misalignment. In some implementations, the transformation of a first set of pixels in a first display includes a rotation operation applied to the first set of pixels in the first display. In such an implementation, the rotation operation is represented as a rotation matrix.

In some implementations, the determination of the transformation involves a deterministic operation on the image data 542 (e.g., determination of components of rotation that produces aligned images in display). In some implementations, the determination of the transformation involves a machine learning operation (e.g., application of a convolutional neural network) on the image data 542.

In some implementations, when the image capture device includes sets of phase detection photodiodes, the image manager 540 is further configured to produce image data 542 from signal data received from the phase detection photodiodes.

The transformation manager 550 is configured to apply transformation data 552 to the sets of pixels of the smartglasses displays to correct the display vertical misalignment. For example, when a transformation of the first set of pixels within the first display involving a rotation is determined, the transformation manager 550 left multiplies a position of the first set of pixels within the first display by a rotation matrix to produce a new set of positions for the first set of pixels within the first display. The transformation is applied to the set of pixels within the second display similarly with its own rotation.

The components (e.g., modules, processing units 524) of processing circuitry 520 can be configured to operate based on one or more platforms (e.g., one or more similar or different platforms) that can include one or more types of hardware, software, firmware, operating systems, runtime libraries, and/or so forth. In some implementations, the components of the processing circuitry 520 can be configured to operate within a cluster of devices (e.g., a server farm). In such an implementation, the functionality and processing of the components of the processing circuitry 520 can be distributed to several devices of the cluster of devices.

The components of the processing circuitry 520 can be, or can include, any type of hardware and/or software configured to correct misalignment of smartglasses displays. In some implementations, one or more portions of the components shown in the components of the processing circuitry 520 in FIG. 5 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the processing circuitry 520 can be, or can include, a software module configured for execution by at least one processor (not shown). In some implementations, the functionality of the components can be included in different modules and/or different components than those shown in FIG. 5, including combining functionality illustrated as two components into a single component.

Although not shown, in some implementations, the components of the processing circuitry 520 (or portions thereof) can be configured to operate within, for example, a data center (e.g., a cloud computing environment), a computer system, one or more server/host devices, and/or so forth. In some implementations, the components of the processing circuitry 520 (or portions thereof) can be configured to operate within a network. Thus, the components of the processing circuitry 520 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the search system can be, or can include, processors configured to process instructions stored in a memory. For example, test pattern manager 530 (and/or a portion thereof), image manager 540 (and/or a portion thereof), and transformation manager 550 (and/or a portion thereof) are examples of such instructions.

In some implementations, the memory 526 can be any type of memory such as a random-access memory, a disk drive memory, flash memory, and/or so forth. In some implementations, the memory 626 can be implemented as more than one memory component (e.g., more than one RAM component or disk drive memory) associated with the components of the processing circuitry 520. In some implementations, the memory 526 can be a database memory. In some implementations, the memory 526 can be, or can include, a non-local memory. For example, the memory 526 can be, or can include, a memory shared by multiple devices (not shown). In some implementations, the memory 526 can be associated with a server device (not shown) within a network and configured to serve the components of the processing circuitry 520. As illustrated in FIG. 5, the memory 526 is configured to store various data, including test pattern data 532, image data 542, and transform data 552.

Figure 6:
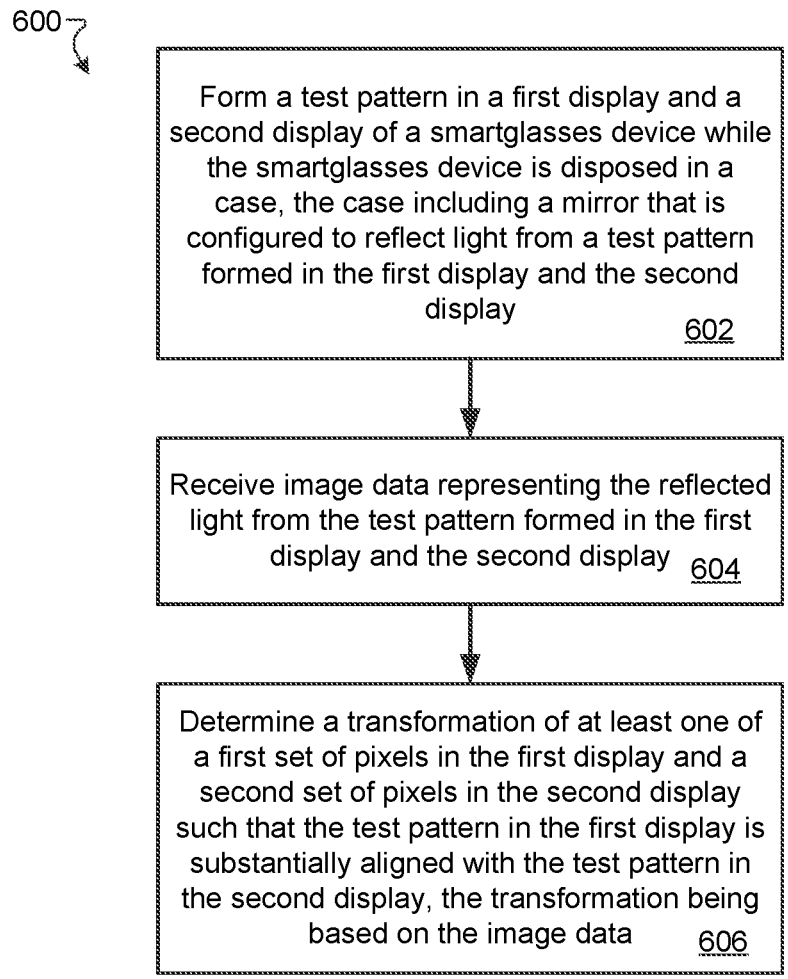
FIG. 6 is a flow chart illustrating a method of performing a calibration operation on smartglasses when stored in the case.

FIG. 6 is a flow chart illustrating a method 600 of performing a calibration operation on smartglasses when stored in the case.

At 602, a test pattern manager (e.g., test pattern manager 530) forms a test pattern (e.g., test pattern 226) in a first display and a second display (e.g., displays 224(1) and 224(2)) of a smartglasses device (e.g., 220) while the smartglasses device is disposed in a case (e.g., 210). The case includes a mirror (e.g., mirror 230) that is configured to reflect light from a test pattern (e.g., test pattern 226) formed in the first display (e.g., display 224(1)) and the second display (e.g., display 224(2)).

At 604, an image manager (e.g., image manager 540) receives image data (e.g., 542) representing the reflected light from the test pattern formed in the first display and the second display.

At 606, the image manager determines a transformation (e.g., transformation data 552) of at least one of a first set of pixels in the first display and a second set of pixels in the second display such that the test pattern in the first display is substantially aligned with the test pattern in the second display, the transformation being based on the image data. In the implementations, the transformation is determined from a first rotation between the first display and the world-facing camera and a second rotation between the second display and the world-facing camera.

Figure 7:
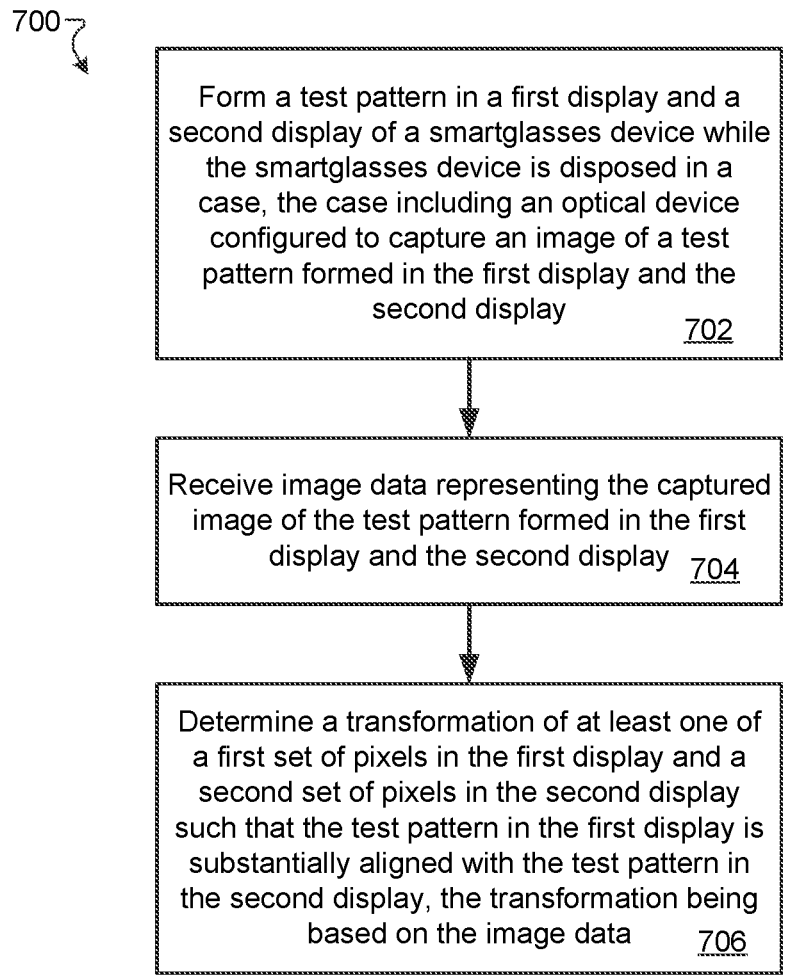
FIG. 7 is a flow chart illustrating a method of performing a calibration operation on smartglasses when stored in the case.

FIG. 7 is a flow chart illustrating a method 700 of performing a calibration operation on smartglasses when stored in the case.

At 702, a test pattern manager (e.g., test pattern manager 530) forms a test pattern (e.g., test pattern 326) in a first display and a second display (e.g., displays 324(1) and 324(2)) of a smartglasses device (e.g., 320) while the smartglasses device is disposed in a case (e.g., 310). The case includes an optical device configured to capture an image of a test pattern formed in the first display and the second display. In some implementations, the optical device is a pair of cameras (e.g., camera pair 330). In some implementations, the optical device includes sets of phase detection photodiodes (e.g., sets pf phase detection photodiodes 432(1) and 432(2)).

At 704, an image manager (e.g., image manager 540) receives image data representing the captured image of the test pattern formed in the first display and the second display.

At 706, the image manager determines a transformation of at least one of a first set of pixels in the first display and a second set of pixels in the second display such that the test pattern in the first display is substantially aligned with the test pattern in the second display, the transformation being based on the image data.

In another aspect, an apparatus includes a case for enclosing a smartglasses device, the case including a mirror that is configured to reflect light from a test pattern formed in a first display of the smartglasses device and a second display of the smartglasses device. The case enables the smartglasses device to, while disposed in the case, receive reflected light from the test pattern and determine an alignment error between the first display and the second display based on the reflected light from the test pattern.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A system, comprising:
   a smartglasses device including a first display and a second display;
   a case for enclosing the smartglasses device, the case including a mirror that is configured to reflect light from a test pattern formed in the first display and the second display; and
   the smartglasses device further including processing circuitry coupled to a memory, the processing circuitry being configured to, while disposed within the case:
   form the test pattern in each of the first display and the second display;
   receive image data representing the reflected light from the test pattern formed in the first display and the second display; and
   determine a transformation of at least one of a first set of pixels in the first display and a second set of pixels in the second display such that the test pattern in the first display is substantially aligned with the test pattern in the second display, the transformation being based on the image data.

2. The system as in claim 1, wherein the mirror is disposed on an end of the case facing a world-facing side of the smartglasses device, and the light is leaked from the first display and the second display.

3. The system as in claim 2, wherein the mirror is a rectangle that includes a set of fiducial markers.

4. The system as in claim 2, wherein the mirror is curved to reduce a size of the case.

5. The system as in claim 2, wherein the smartglasses device further includes a world-facing camera disposed on a frame of the smartglasses device;
   wherein the image data is received via the world-facing camera.

6. The system as in claim 2, wherein the transformation includes a rotation of the first set of pixels.

7. A system, comprising:
   a smartglasses device including a first display and a second display;
   a case for enclosing the smartglasses device, the case including an optical device that is configured to capture an image of a test pattern formed in the first display and the second display; and
   the smartglasses device further including processing circuitry coupled to a memory, the processing circuitry being configured to, while disposed within the case:
   form the test pattern in each of the first display and the second display;
   receive image data representing the captured image of the test pattern formed in the first display and the second display; and
   determine a transformation of at least one of a first set of pixels in the first display and a second set of pixels in the second display such that the test pattern in the first display is substantially aligned with the test pattern in the second display, the transformation being based on the image data.

8. The system as in claim 7, wherein the optical device includes:
   a pair of cameras disposed on either end of a rigid body, the rigid body being disposed on an end of the case facing a user side of the smartglasses device, the pair of cameras including a first camera configured to capture a first image of the test pattern and a second camera configured to capture a second image of the test pattern; and
   a communications module configured to transmit the first image and the second image to the processing circuitry of the smartglasses device as the image data.

9. The system as in claim 8, wherein the transformation includes a first rotation of the first set of pixels and a second rotation of the second set of pixels.

10. The system as in claim 7, wherein the optical device includes:
    a pair of phase detection photodiode sets disposed on either end of a rigid body, the rigid body being disposed on an end of the case facing a user side of the smartglasses device, the pair of phase detection photodiode sets including a first set of phase detection photodiodes configured to detect a first location of a portion of the test pattern in the first display and a second set of phase detection photodiodes configured to detect a second location of the portion of the test pattern in the second display; and
    a communications module configured to transmit the first location and the second location to the processing circuitry of the smartglasses device as the image data.

11. A method, comprising:
    forming a test pattern in a first display and a second display of a smartglasses device while the smartglasses device is disposed in a case, the case including a mirror configured to reflect light from a test pattern formed in the first display and the second display;
    receiving image data representing the reflected light from the test pattern formed in the first display and the second display; and
    determining a transformation of at least one of a first set of pixels in the first display and a second set of pixels in the second display such that the test pattern in the first display is substantially aligned with the test pattern in the second display, the transformation being based on the image data.

12. The method as in claim 11, wherein the mirror is disposed on an end of the case facing a world-facing side of the smartglasses device, and the light is leaked from the first display and the second display.

13. The method as in claim 12, wherein the mirror is a rectangle that includes a set of fiducial markers.

14. The method as in claim 12, wherein the mirror is curved to reduce a size of the case.

15. The method as in claim 12, wherein the smartglasses device further includes a world-facing camera disposed on a frame of the smartglasses device;
    wherein the image data is received via the world-facing camera.

16. The method as in claim 12, wherein the transformation includes a rotation of the first set of pixels.

17. A method, comprising:
    forming a test pattern in a first display and a second display of a smartglasses device while the smartglasses device is disposed in a case, the case including an optical device configured to capture an image of a test pattern formed in the first display and the second display;
    receiving image data representing the captured image of the test pattern formed in the first display and the second display; and determining a transformation of at least one of a first set of pixels in the first display and a second set of pixels in the second display such that the test pattern in the first display is substantially aligned with the test pattern in the second display, the transformation being based on the image data.

18. The method as in claim 17, wherein the optical device includes:
- a pair of cameras disposed on either end of a rigid body, the rigid body being disposed on an end of the case facing a user side of the smartglasses device, the pair of cameras including a first camera configured to capture a first image of the test pattern and a second camera configured to capture a second image of the test pattern; and
- a communications module configured to transmit the first image and the second image to processing circuitry of the smartglasses device as the image data.

19. The method as in claim 18, wherein the transformation includes a first rotation of the first set of pixels and a second rotation of the second set of pixels.

20. The method as in claim 17, wherein the optical device includes:
- a pair of phase detection photodiode sets disposed on either end of a rigid body, the rigid body being disposed on an end of the case facing a user side of the smartglasses device, the pair of phase detection photodiode sets including a first set of phase detection photodiodes configured to detect a first location of a portion of the test pattern in the first display and a second set of phase detection photodiodes configured to detect a second location of the portion of the test pattern in the second display; and
- a communications module configured to transmit the first location and the second location to processing circuitry of the smartglasses device as the image data.

* * * * *